United States Patent
Noh

(10) Patent No.: US 8,227,137 B2
(45) Date of Patent: Jul. 24, 2012

(54) POLYMER MEMBRANE FOR FUEL CELL AND METHOD OF PREPARING THE SAME

(75) Inventor: Hyung-Gon Noh, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1337 days.

(21) Appl. No.: 11/159,518

(22) Filed: Jun. 21, 2005

(65) Prior Publication Data

US 2006/0003215 A1  Jan. 5, 2006

(30) Foreign Application Priority Data

Jun. 30, 2004 (KR) .................. 10-2004-0050760

(51) Int. Cl.
*H01M 8/10* (2006.01)
*H01M 2/14* (2006.01)

(52) U.S. Cl. .................. 429/491; 429/493; 429/129

(58) Field of Classification Search ............... 429/129, 429/491–493

See application file for complete search history.

(56) References Cited

U.S. PATENT DOCUMENTS

| | | | | |
|---|---|---|---|---|
| 4,786,669 A * | 11/1988 | Dewhirst | ...................... | 523/445 |
| 6,239,204 B1 * | 5/2001 | Miura et al. | .................. | 524/401 |
| 6,933,078 B2 * | 8/2005 | Huang et al. | ............. | 429/231.95 |
| 6,962,959 B2 * | 11/2005 | Kurano et al. | ............. | 525/326.1 |
| 7,160,968 B2 | 1/2007 | Ito et al. | | |
| 2001/0034399 A1 * | 10/2001 | Kohlhammer et al. | ....... | 524/501 |
| 2005/0014658 A1 | 1/2005 | Akao | | |
| 2005/0244694 A1 | 11/2005 | Kiefer et al. | | |
| 2006/0035095 A1 | 2/2006 | Calundann et al. | | |

FOREIGN PATENT DOCUMENTS

| | | |
|---|---|---|
| EP | 1 231 655 A1 | 8/2002 |
| JP | 2001-151854 | 6/2001 |
| JP | 2002-083514 | 3/2002 |
| JP | 2002-363304 | 12/2002 |
| JP | 2003-086021 | 3/2003 |
| JP | 2003-257238 | 9/2003 |
| JP | 2004-143388 | 5/2004 |
| JP | 2004-349034 | 12/2004 |
| KR | 2002-0012318 | 2/2002 |
| WO | WO 2004/015802 A1 | 2/2004 |

(Continued)

OTHER PUBLICATIONS

KIPO Office action dated Dec. 23, 2010, for Korean priority Patent application 10-2004-0050760, noting listed references in this IDS, as well as JP 2004-143388, previously filed in an IDS dated Feb. 27, 2009.

(Continued)

*Primary Examiner* — Karie O'Neill Apicella

(74) *Attorney, Agent, or Firm* — Christie, Parker & Hale, LLP

(57) ABSTRACT

A polymer membrane for a fuel cell includes a porous polymer substrate, and a crosslinked polymer layer having a proton-conductive functional group coated on at least one side of the porous polymer substrate. A method of preparing the polymer membrane includes: (1) providing a coating composition that includes a monomer or a prepolymer having the proton-conductive functional group and a crosslinking catalyst; (2) coating the coating composition on the at least one side of the porous polymer substrate; and (3) crosslinking the monomer or the prepolymer coated on the porous polymer substrate.

11 Claims, 3 Drawing Sheets

FOREIGN PATENT DOCUMENTS

WO    WO 2004/018594  A1    3/2004
WO    WO 2004/030135  A2    4/2004

OTHER PUBLICATIONS

Patent Abstracts of Japan and English machine translation of Japanese Publication 2002-363304 listed above, 12 pages.

Japanese Office action dated Mar. 15, 2011, for corresponding Japanese Patent application 2005-182375, noting listed references in this IDS.

Patent Abstracts of Japan, and English machine translation of Japanese Publication 2001-151854, listed above, 11 pages.

Patent Abstracts of Japan, and English machine translation of Japanese Publication 2002-083514, listed above, 23 pages.

Patent Abstracts of Japan, and English machine translation of Japanese Publication 2003-257238, listed above, 14 pages.

Patent Abstracts of Japan, and English machine translation of Japanese Publication 2004-349034, listed above, 15 pages.

* cited by examiner

POLYMER MEMBRANE FOR FUEL CELL AND METHOD OF PREPARING THE SAME

CROSS REFERENCE TO RELATED APPLICATION

This application claims priority to and the benefit of Korean Patent Application No. 10-2004-0050760 filed on Jun. 30, 2004 in the Korean Intellectual Property Office, the entire disclosure of which is incorporated herein by reference.

FIELD OF THE INVENTION

The present invention relates to a polymer membrane for a fuel cell and a method of preparing the same, and more particularly to a polymer membrane for a fuel cell capable of saving costs, operating without a humidifier (or without humidifying), and having an improved proton conductivity (or permeability) and mechanical strength, and a method of preparing the same.

BACKGROUND OF THE INVENTION

A fuel cell is a power generation system for producing electrical energy through electrochemical redox reaction of oxygen and hydrogen in a hydrocarbon-based material such as methanol, ethanol, or natural gas.

A fuel cell can be classified into a phosphoric acid type, a molten carbonate type, a solid oxide type, a polymer electrolyte type, or an alkaline type depending upon the kind of electrolyte used. Although each of these different types of fuel cells operates in accordance with the same basic principles, they may differ from one another in the kind of fuel, the operating temperature, the catalyst, and the electrolyte used.

Recently, a polymer electrolyte membrane fuel cell (PEMFC) has been developed. The PEMFC has power characteristics that are superior to conventional fuel cells, as well as a lower operating temperature and faster start and response characteristics. Because of this, the PEMFC can be applied to a wide array of fields such as for transportable electrical sources for automobiles, distributed power sources such as for houses and public buildings, and small electrical sources for electronic devices.

A PEMFC is essentially composed of a stack, a reformer, a fuel tank, and a fuel pump. The stack forms a body of the PEMFC, and the fuel pump provides fuel stored in the fuel tank to the reformer. The reformer reforms the fuel to generate the hydrogen gas and supplies the hydrogen gas to the stack. Fuel stored in the fuel tank is pumped to the reformer using power which can be provided by the PEMFC. Then, the reformer reforms the fuel to generate the hydrogen gas, and the hydrogen gas is electrochemically reacted with oxygen in the stack to generate the electrical energy.

Alternatively, a fuel cell may include a direct methanol fuel cell (DMFC) in which a liquid methanol fuel is directly introduced to the stack. Unlike a PEMFC, a DMFC does not require a reformer.

In the above-mentioned fuel cell system, the stack for generating the electricity has a structure in which several unit cells, each having a membrane electrode assembly (MEA) and a separator (referred to also as "bipolar plate"), are stacked adjacent to one another. The MEA is composed of an anode (referred to also as "fuel electrode" or "oxidation electrode") and a cathode (referred to also as "air electrode" or "reduction electrode") that are separated by a polymer electrolyte membrane.

FIG. 1 is a schematic view showing an operating state of a fuel cell 1. The fuel cell 1 includes an anode 3, a cathode 5, and a polymer electrolyte membrane (or polymer membrane) 7. As shown in FIG. 1, when fuel such as hydrogen gas is supplied to the anode 3, an electrochemical oxidation reaction occurs to ionize and oxidize the fuel into protons ($H^+$) and electrons ($e^-$). The polymer electrolyte membrane 7 permeates the ionized protons to the cathode 5, but the polymer electrolyte membrane 7 does not permeate the electrons. The electrons are transmitted to the cathode 5 though an out-circuit (not shown). The transmitted (or permeated) protons ($H^+$) on the cathode 5 are electrochemically reacted with oxygen contained in an oxidant on the cathode 5 to generate reaction heat and water. The electrical energy is generated by the transmittance of the electrons through the out-circuit. The chemical reactions in the fuel cell 1 may be illustrated by the following reactions:

Anode reaction: 
Cathode reaction: 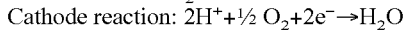

A polymer membrane-electrode assembly (MEA) is composed of a solid polymer electrolyte membrane (e.g., the membrane 7 of FIG. 1) and an electrode layer including catalysts supported on carbon. The polymer electrolyte membrane can be fabricated using a perfluorosulfonic acid ionomer membrane such as Nafion® (by DuPont), Flemion® (by Asahi Glass), Asiplex® (by Asahi Chemical), and Dow XUS® (by Dow Chemical). The electrode layer including the catalysts supported on the carbon can be fabricated by binding the electrode substrates such as a porous carbon paper or a carbon cloth with a carbon powder carrying pulverized catalyst particles such as platinum (Pt) or ruthenium (Ru) using a waterproof binder.

Conventional polymer membranes such as Nafion® have good proton conductivity (or proton permeability), good anti-corrosiveness, and good chemical resistance, but they are also high in cost and may allow methanol to crossover. Further, the conventional polymer membranes require a separate humidifier for humidifying the membranes because a supply of water is needed to permeate the protons ($H^+$) through the membranes. Because of this, additional devices and spaces are needed. In addition, the conventional polymer membranes also have problems in that the needed water (moisture) is evaporated when the conventional polymer membranes are operated at a high temperature, thereby deteriorating their proton conductivity (or proton permeability).

SUMMARY OF THE INVENTION

An embodiment of the present invention provides a polymer membrane for a fuel cell that is capable of saving costs and operating without a humidifier (or without humidifying) and having good proton conductivity (or proton permeability) and good mechanical strength, and a method of preparing the same.

Another embodiment provides a fuel cell including the above-mentioned polymer membrane.

An embodiment of the present invention provides a polymer membrane for a fuel cell. The polymer membrane includes a porous polymer substrate, and a cross-linked polymer layer on the porous polymer substrate, the cross-linked polymer layer having a proton-conductive functional group.

An embodiment of the present invention also provides a method of preparing a polymer membrane for a fuel cell. The method includes: (1) providing a coating composition having a crosslinking catalyst and a material having a proton-conductive functional group selected from the group consisting of monomers and prepolymers; (2) coating the coating composition on a porous substrate; and (3) crosslinking the material coated on the porous substrate to form a crosslinked polymer layer.

An embodiment of the present invention further provides a fuel cell having at least two separators and a membrane-electrode assembly between the at least two separators. The membrane-electrode assembly includes the above described polymer membrane.

DETAILED DESCRIPTION

Figure 1:
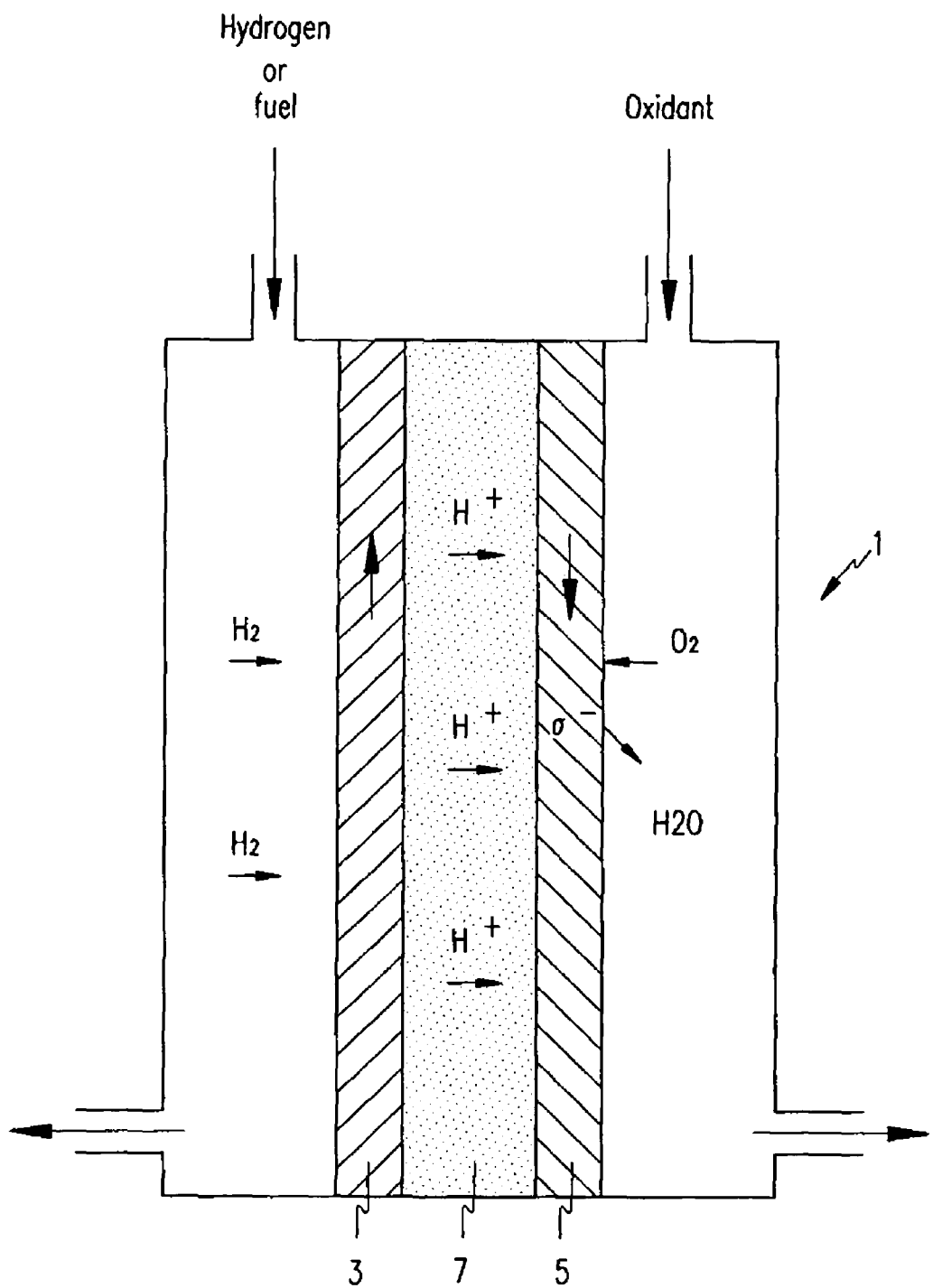
FIG. 1 is a schematic cross-sectional view showing an operating state of a fuel cell having a polymer membrane.

The present invention relates to a polymer membrane for a fuel cell that is capable of saving costs and space, and of operating under no humidifying (i.e., without needing to install a humidifier); and a method of preparing the same.

A polymer membrane for a fuel cell of an embodiment of the present invention includes a porous substrate and a crosslinked polymer layer having a proton-conductive functional group coated on at least one surface of the porous polymer substrate.

The proton-conductive function group of the crosslinked polymer layer includes sulfonic acid ($SO_3H$), carboxyl (COOH), hydroxyl (OH), and/or phosphoric acid groups. The proton-conductive functional group formed on the polymer layer is ionized to provide proton conductivity (or permeability). The porous substrate is preferably formed as a microporous thin film or an unwoven fabric. The porous substrate is preferably formed of any material having high absorptiveness of moisture. Suitable materials that can be used to form the porous substrate include polyacrylic acid, polyvinyl alcohol, polyolefin, polyester, polysulfone, polyimide, polyesterimide, polyamide, polytetrafluoroethylene, rayon, and/or glass fiber. Among them, polyacrylic acid and/or polyvinyl alcohol are preferable.

The crosslinked polymer layer may be formed on one side or both sides of the porous substrate or it may be formed on only an area contacted with an anode layer and/or a catalyst layer. In one embodiment, the crosslinked polymer layer is coated on an anode and/or a cathode. In one embodiment, the crosslinked polymer layer coated on (or contacted with) an anode is identical to or different from the crosslinked polymer coated on (or contacted with) a cathode.

The porous substrate is able to keep good mechanical strength of the membrane, and the crosslinked polymer layer can improve the proton conductivity (or permeability) of the membrane.

The crosslinked polymer layer may be formed on the entire surface area of the polymer membrane, or only on the area of the polymer membrane contacted with a catalyst layer.

The crosslinked polymer layer is between 0.01 and 98 parts by weight based on 100 parts by weight for the polymer membrane. That is, when the crosslinked polymer layer is less than 0.01 parts by weight, the proton conductivity (or permeability) is too deteriorated. Alternatively, when the crosslinked polymer layer is more than 98 parts by weight, the polymer membrane is too thick. The thickness ratio of the porous substrate to the crosslinked polymer layer is preferably from 1:0.01 to 1:200, more preferably from 1:0.01 to 1:100. When the thickness ratio is within this range, the polymer membrane will exhibit good mechanical characteristics and good proton conductivity (or permeability).

The crosslinked polymer layer is formed by crosslinking a monomer or a prepolymer having a proton-conductive functional group. That is, the polymer layer is obtained by (1) providing a composition having a monomer or a prepolymer that has a proton-conductive functional group and a crosslinking catalyst; (2) coating the composition on at least one surface of the porous polymer substrate; and (3) crosslinking the monomer or the prepolymer coated on the porous polymer substrate.

The monomer or the prepolymer may include a compound having a proton-conductive functional group, preferably a compound in which the proton-conductive functional group is introduced to an epoxide compound, a urethane compound, an acrylate compound, and/or a methacrylate compound.

The epoxide compound may include a compound having an epoxide ring. If the epoxide compound is polymerized, it is preferably polymerized with diamine and/or diol. The urethane compound may be obtained by reacting 1,4-butane diol with diphenylmethane diisocyanate. The acrylate compound or methacrylate compound may include an alkyl (meth)acrylate compound. In one embodiment, the alkyl has a carbon number of 4 or less, and more preferably 2 or less; or the di-(meth)acrylate has a total carbon number of 12 or less, preferably 8 or less. Specifically, the compound may include, but is not limited to, methyl acrylate ($CH_2$=$CHCOOCH_3$), hexanediol diacrylate, 1,4-butanediol acrylate, 1,3-butyleneglycol diacrylate, ethyleneglycol diacrylate, pentaerythritol tetraacrylate, triethyleneglycol diacrylate, polyethyleneglycol diacrylate, dipentaerythritol diacrylate, sorbitol triacrylate, bisphenol A diacrylate derivatives, trimethylpropane triacrylate, dipentaerythritol polyacrylate, 1,4-butanediol dimethacrylate, 1,3-butyleneglycol dimethacrylate, ethylene glycol dimethacrylate, pentaerythritol tetramethacrylate, triethyleneglycol dimethacrylate, polyethyleneglycol dimethacrylate, dipentaerythritol dimethacrylate, sorbitol trimethacrylate, bisphenol A dimethacrylate derivatives, trimethylpropane trimethacrylate, dipentaerythritol polymethacrylate, or a mixture thereof.

The crosslinking catalyst may include, but is not limited to, a metal catalyst such as tin (Sn), a peroxide-based compound, and/or an azo-based compound. The peroxide-based compound may include benzoyl peroxide and lauryl peroxide. The azo-based compound may include azobisisobutyronitrile (AIBN). The crosslinking catalyst is preferably added in amounts between 0.001 and 20 parts by weight based on 100 parts by weight for the monomer or the prepolymer. That is, when the amount of the catalyst is less than 0.001 parts by weight, it is hard to promote the crosslinking reaction. Alternatively, when the amount of catalyst is more than 20 parts by weight, the catalyst is excessively wasted.

The composition having the monomer or the prepolymer may further include a solvent in order to improve the coating property. The solvent may include, but is not limited to, an alcohol such as isopropyl alcohol, n-butyl alcohol, and n-propyl alcohol; water; dimethylsulfoxide (DMSO); dimethylacetamide (DMAc); and/or N-methylpyrrolidone (NMP). The coating composition may be applied by screen printing, spray coating, and/or with a doctor blade technique.

The crosslinking reaction of the monomer or the prepolymer is carried out by (1) coating the composition having the monomer or the prepolymer that has the proton-conductive functional group and the crosslinking catalyst on the porous substrate and (2) heating or irradiating the coated composition. When the crosslinking reaction is heated or irradiated, it is preferable that the heating or the irradiating is carried out at a temperature from 20 to 150° C.

Figure 2:
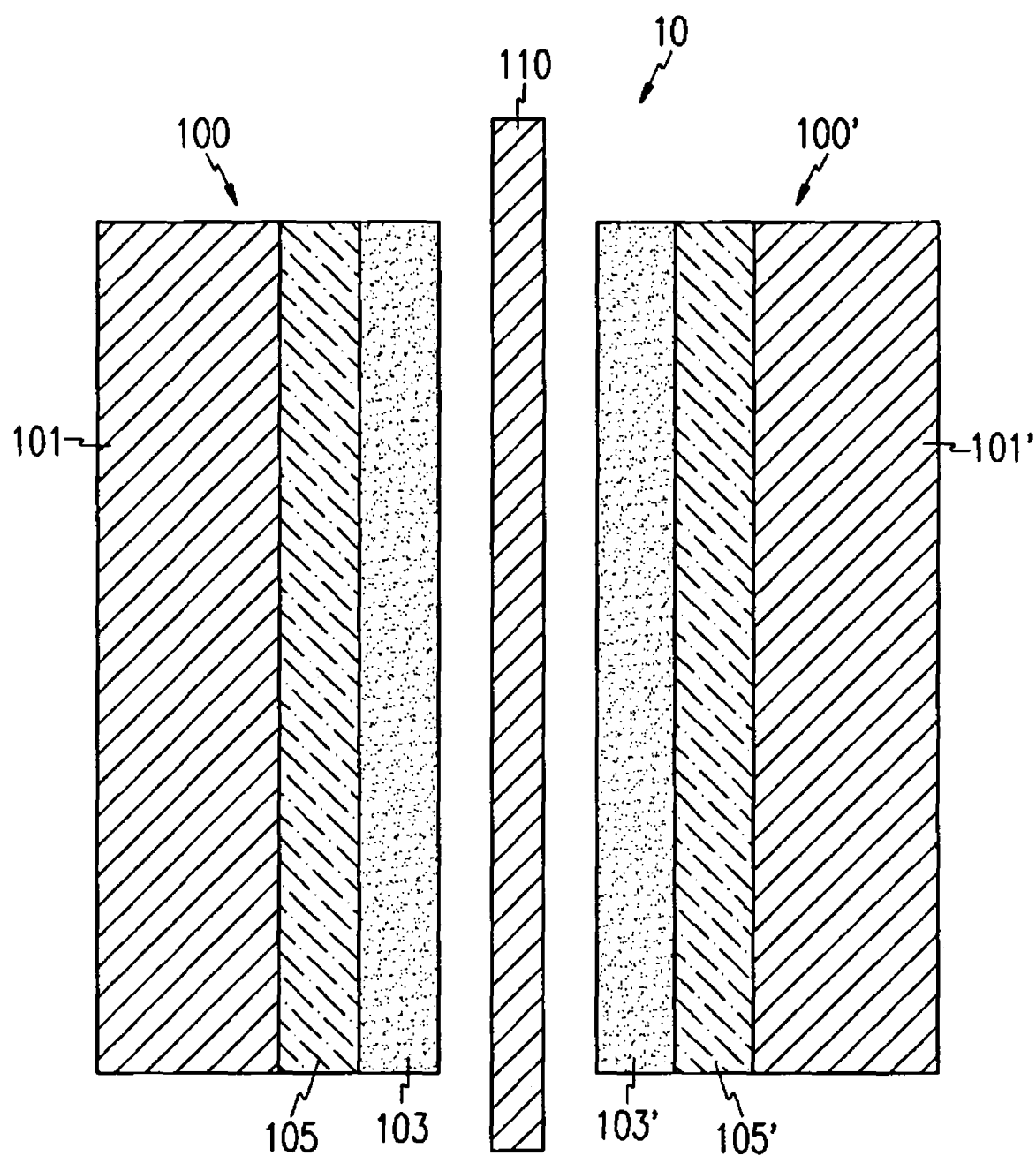
FIG. 2 is a cross-sectional view showing a membrane-electrode assembly having a polymer membrane according to an exemplary embodiment of the present invention.

The thickness of the resulting polymer membrane according to an embodiment of the present invention is preferably between 10 and 200 μm. The polymer membrane is positioned between the cathode and the anode in the fuel cell to provide a membrane electrode assembly (MEA). The cross-sectional view of such a membrane electrode assembly (MEA) is shown in FIG. 2. As shown in FIG. 2, the MEA 10 includes a polymer electrolyte membrane 110 and an anode 100 and cathode 100' which are respectively positioned on either side of the polymer electrolyte membrane 110. The anode 100 and the cathode 100' include electrode substrates 101 and 101' and catalyst layers 103 and 103', respectively.

The electrode substrates 101 and 101' may include carbon paper, carbon cloth, and carbon felt. They may be treated with polytetrafluoroethylene (PTFE) in order to be water-repellant. The electrode substrates 101 and 101' can function both as gas diffusion layers (GDLs) to diffuse the reaction gas into the polymer MEA 10 as well as support layers for the MEA 10.

The catalyst layers 103 and 103' are coated with a metal catalyst which enables a related reaction (the oxidation of hydrogen and the reduction of oxygen). The catalyst layers 103 and 103' are preferably coated with the metal catalyst through a deposition method. Suitable choices for the metal catalyst include platinum, ruthenium, osmium, and platinum-transition metals where suitable transition metals include, but are not limited to, ruthenium, osmium, chromium, copper, and nickel. The metal catalyst is preferably supported on a carrier. The carrier may include carbon such as acetylene black or graphite, or an inorganic particulate such as alumina or silica. A noble metal material supported on the carrier may be used as the metal catalyst. In one embodiment, the catalyst is a commercially available catalyst, or a produced product in which the noble metal material is supported on the carrier.

The MEA 10 may further include microporous layers 105 and 105' for increasing the gas diffusion effects between the electrode substrates 101 and 101' and the catalyst layers 103 and 103', respectively. The microporous layers 105 and 105' can uniformly supply the reaction gas to the catalyst layers 103 and 103' and deliver the electrons formed on the catalyst layers 103 and 103' to the electrode substrates 101 and 101', respectively. Typically, the microporous layers 105 and 105' include a conductive powder having a smaller diameter. Suitable choices for the conductive power include, for example, carbon powder, carbon black, acetylene black, active carbon, fullerene (C60), carbon nanotube, carbon nanohorn, and carbon nanoring.

The MEA 10 is inserted between separators (not shown) where gas flow and cooling channels are formed to provide a unit cell, and a plurality of the unit cells are stacked adjacent to one another to form a stack. The stack is sandwiched between two end plates to provide a fuel cell. These and other components of the fuel cell may be fabricated by any suitable techniques known to those skilled in art. In addition, the MEA 10 of FIG. 2 may be included in any fuel cells such as a fuel cell operating with a humidifier that is humidifying at a low temperature, a fuel cell operating without a humidifier (or under no humidifying) and at a low temperature, and a fuel cell operating without a humidifier (or under no humidifying) and at a high temperature.

The following examples illustrate the present invention in more detail. However, it is understood that the present invention is not limited by these examples.

EXAMPLE 1

200 g of an epoxide-based compound represented by the following Formula 1 were mixed with 200 g of a diamine compound represented by the following Formula 2, and 5 g of an Sn catalyst were added and agitated to obtain a coating compound. The obtained compound was coated on an unwoven fabric at a thickness of 10 micrometers. The coated unwoven (or non-woven) fabric was heat treated at a temperature of 80° C. for 4 hours to progress a crosslinking reaction and to obtain a polymer membrane with a crosslinked polymer layer.

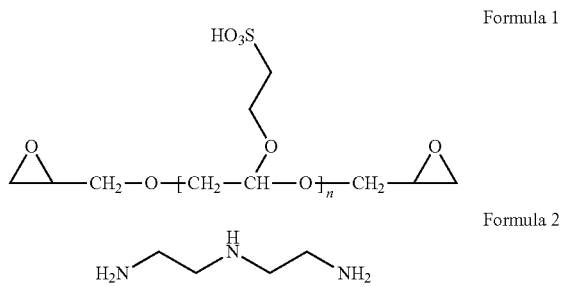

On both sides of the coated unwoven fabric, carbon paper with a platinum catalyst layer was placed and pressed to obtain a MEA. To provide a unit cell of a fuel cell, the obtained MEA was inserted between two gasket sheets, sandwiched between two separators having a certain-shaped gas flow channel and a cooling channel, and compressed between two copper end plates.

EXAMPLE 2

500 g of a polyethyleneglycol diacrylate (PEGDA) compound for an acrylate based compound was mixed with 5 g of an AIBN catalyst and agitated to obtain a coating composition. The composition was coated on an unwoven fabric at a thickness of 10 micrometers. The coated unwoven fabric was irradiated with ultraviolet rays to promote a crosslinking reaction and to produce a polymer membrane with a crosslinked polymer layer.

A unit cell was fabricated using the obtained polymer membrane in accordance with substantially the same procedures as in Example 1.

COMPARATIVE EXAMPLE 1

A unit cell was fabricated in accordance with substantially the same procedure as in Example 1, except that a poly (perfluorosulfonic acid) electrolyte membrane (Nafion®, DuPont) was used as a polymer membrane for the unit cell of a fuel cell.

Figure 3:
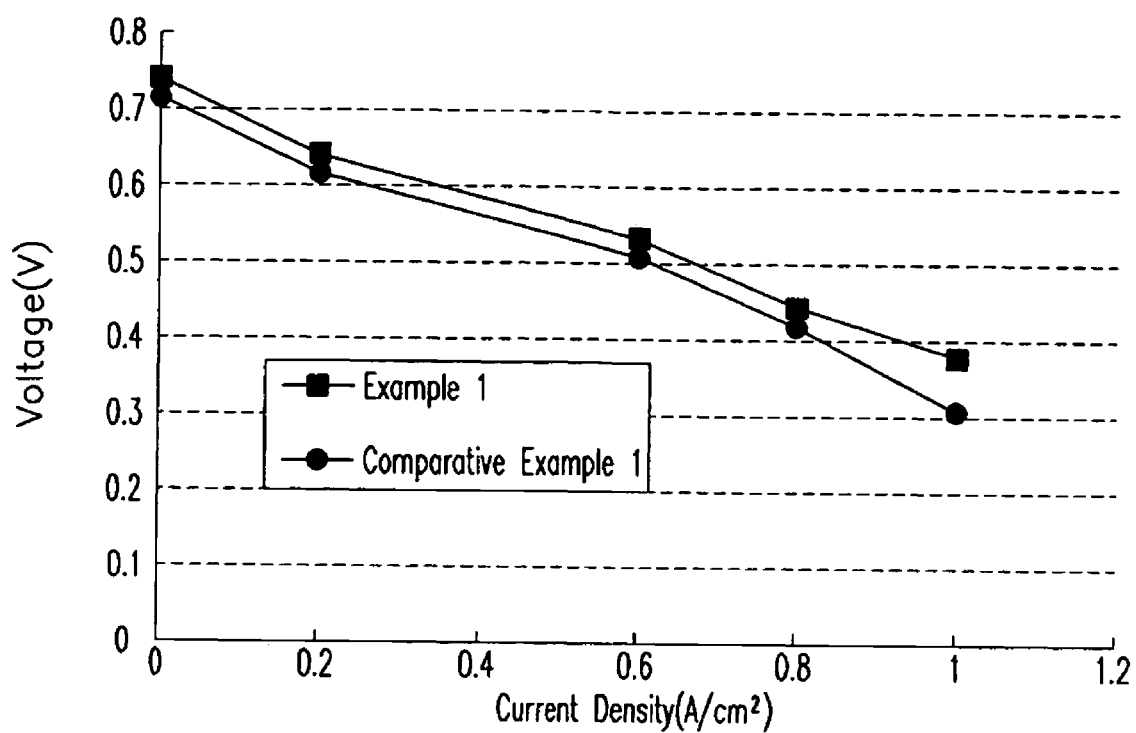
FIG. 3 is a graph showing voltage and current density characteristics of unit cells according to Example 1 of the present invention and Comparative Example 1.

Hydrogen gas at a temperature of 60° C. and normal pressure was then introduced into the unit cells of Examples 1 and 2 and Comparative Example 1, and the current density and the voltage thereof were determined. The current density and voltage characteristics for the cells of Example 1 and Comparative Example 1 are shown in FIG. 3. As shown in FIG. 3, the current density and voltage characteristics for the cell of Example 1 are higher or superior to those of Comparative Example 1.

In view of the foregoing, an embodiment of the present invention is able to provide a polymer membrane for a fuel cell having good proton conductivity and mechanical strength at a low cost because the polymer membrane is prepared with a crosslinked polymer layer having a proton-conductive functional group coated on a porous polymer substrate. Further, the polymer membrane can operate under a non-humidifying environment without installing a humidifier so that the cost and the space needed for the humidifier are advantageously saved.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A polymer membrane for a fuel cell, comprising
a porous polymer substrate; and
a crosslinked polymer layer on the porous polymer substrate, the crosslinked polymer layer comprising an epoxide-derived group having a proton-conductive functional group, wherein the proton-conductive functional group is selected from the group consisting of sulfonic acid groups ($SO_3H$), phosphoric acid groups, and combinations thereof.

2. The polymer membrane for a fuel cell according to claim 1, wherein the crosslinked polymer layer is between 0.01 and 98 parts by weight based on 100 parts by weight for the polymer membrane.

3. The polymer membrane for a fuel cell according to claim 1, wherein a thickness ratio of the porous polymer substrate to the crosslinked polymer layer is between 1:0.01 and 1:200.

4. The polymer membrane for a fuel cell according to claim 1, wherein the porous polymer substrate is a non-woven fabric or a porous thin film.

5. The polymer membrane for a fuel cell according to claim 1, wherein the porous polymer substrate comprises a material selected from the group consisting of polyacrylic acid, polyvinyl alcohol, polyolefin, polyester, polysulfone, polyimide, polyesterimide, polyamide, polytetrafluoroethylene, rayon, and glass fiber.

6. A fuel cell comprising at least two separators and a membrane-electrode assembly between the at least two separators, the membrane-electrode assembly comprising:
at least two electrodes; and
a polymer membrane between the at least two electrodes of the membrane-electrode assembly, the polymer membrane comprising a porous polymer substrate and a crosslinked polymer layer, the crosslinked polymer layer comprising an epoxide-derived group having a proton-conductive functional group, wherein the proton-conductive functional group is selected from the group consisting of sulfonic acid groups ($SO_3H$), phosphoric acid groups, and combinations thereof.

7. The fuel cell according to claim 6, wherein the crosslinked polymer layer is between 0.01 to 98 parts by weight based on 100 parts by weight for the polymer membrane.

8. The fuel cell according to claim 6, wherein a thickness ratio of the porous polymer substrate to the crosslinked polymer layer is between 1:0.01 and 1:200.

9. The fuel cell according to claim 6, wherein the porous polymer substrate is a non-woven fabric or a porous thin film.

10. The polymer membrane for a fuel cell according to claim 1, wherein the crosslinked polymer layer further comprises one selected from a diamine and a diol.

11. The polymer membrane for a fuel cell according to claim 1, wherein the epoxide-derived group having the proton-conductive functional group is represented by Formula 1:

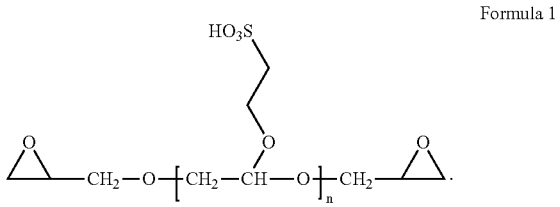

Formula 1

* * * * *